(12) United States Patent
Ikeda et al.

(10) Patent No.: US 6,319,633 B1
(45) Date of Patent: Nov. 20, 2001

(54) RECHARGEABLE LITHIUM BATTERY

(75) Inventors: Hiroaki Ikeda, Hyogo; Masahisa Fujimoto, Osaka; Shin Fujitani, Hirakata, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/503,547

(22) Filed: Feb. 14, 2000

(30) Foreign Application Priority Data

Feb. 15, 1999 (JP) ................................. 11-035570

(51) Int. Cl.$^7$ ................................. H01M 10/24
(52) U.S. Cl. ................. 429/231.95; 429/231.5; 429/218.1
(58) Field of Search ............ 429/231.95, 231.8, 429/218.1, 220, 231.5, 224, 221, 223, 231.1; 423/560, 511

(56) References Cited

U.S. PATENT DOCUMENTS

| | | | | |
|---|---|---|---|---|
| 4,822,590 | * | 4/1989 | Morrison et al. | 423/561.1 |
| 4,996,108 | * | 2/1991 | Divigalpitiya et al. | 428/411.1 |
| 5,569,561 | * | 10/1996 | Exnar et al. | 429/218 |

FOREIGN PATENT DOCUMENTS

| | | |
|---|---|---|
| 59-90361 | 5/1984 | (JP) . |
| 63-102162 | 5/1988 | (JP) . |
| 6-275315 | 9/1994 | (JP) . |
| 11-067210 | 3/1999 | (JP) . |

OTHER PUBLICATIONS

Article Entitled: "Lithium Electrochemical Cells at Low Voltage: Decomposition of Mo and W Dichalcogenides"; by L. S. Selwyn et al.; Solid State Ionics 22 (1987), pp. 337–344.

Article Entitled: Review "Layer type tungsten dichalcogenide compounds: their preparation, structure, properties and uses"; by S.K. Srivastava et al.; Journal of Materials Science 20 (1985), pp. 3801–3815.

Book: "Binary Alloy Phase Diagrams", vol. 2, American Society for Metals; 1986, pp. 797, 859, 956, 1103, 1500, 1585; 1751; 2012; and 2013.

Article Entitled: "Why transition metal (di) oxides are the most attractive materials for batteries"; by Tsutomu Ohzuku et al.; Solid State Ionics 69 (1994), pp. 201–211.

\* cited by examiner

*Primary Examiner*—Gabrielle Brouillette
*Assistant Examiner*—M. Wills
(74) *Attorney, Agent, or Firm*—W. F. Fasse; W. G. Fasse

(57) ABSTRACT

A rechargeable lithium battery has a positive electrode, a negative electrode and a non-aqueous electrolyte. The active material of the positive or negative electrode is tungsten complex sulfide, either with or without addition of lithium thereto. The tungsten complex sulfide contains tungsten, sulfur and at least one transition metal selected from Cu, V, Cr, Mn, Fe, Co and Ni, and has substantially the same crystal structure as $WS_2$.

13 Claims, 2 Drawing Sheets

RECHARGEABLE LITHIUM BATTERY

BACKGROUND OF THE INVENTION

1. Field of the Invention

The present invention relates to a rechargeable lithium battery including a positive electrode, a negative electrode and a non-aqueous electrolyte, and more particularly to a rechargeable lithium battery incorporating the improved active material, for use in the positive or negative electrode, which undergoes a reversible electrochemical reaction with a lithium ion.

2. Description of Related Art

In recent years, intensive efforts have been made to develop rechargeable lithium batteries. Rechargeable lithium batteries are known as relying their battery performances, such as charge-discharge voltages, charge-discharge cycle life characteristics and storage capability, largely on the particular electrode active materials used. Thus extensive searches for improved electrode materials have been conducted to achieve improvements in performance of batteries.

In Japanese Patent Laying-Open No. Hei 6-275315 (1994), a rechargeable lithium battery is disclosed which employs a combination of transition metal sulfide active material and a lithium-ion conducting solid electrolyte to improve the battery performances. However, the use of tungsten disulfide ($WS_2$) for a positive electrode material results in the reduced charge-discharge cycle life performance, because a crystal structure of $WS_2$, serving as the positive active material, is significantly affected by insertion and release of lithium ions.

SUMMARY OF THE INVENTION

The present invention is directed toward solving the above-described problem and its object is to provide a rechargeable lithium battery which exhibits excellent charge-discharge cycle characteristics, such as a cycle life of several tens of cycles practically required for secondary batteries.

A rechargeable lithium battery of the present invention includes a positive electrode, a negative electrode and a non-aqueous electrolyte. Characteristically, the active material of the positive or negative electrode is comprised of tungsten complex sulfide, either with or without addition of lithium thereto, which contains tungsten, sulfur, and at least one transition metal selected from Cu, V, Cr, Mn, Fe, Co and Ni, and has substantially the same crystal structure as $WS_2$.

Specifically, the rechargeable lithium battery in accordance with the present invention uses, as positive or negative active material, tungsten complex sulfide, either with or without addition of lithium thereto, which is represented by the formula $M_xW_{1-x}S_2$ where M is at least one selected from Cu, V, Cr, Mn, Fe, Co and Ni, and x satisfies the relationship $0<x<0.48$, and which has substantially the same crystal structure as $WS_2$.

In the present invention, a crystal structure of the active material has been stabilized by the substitution of the metallic element M (Cu, V, Cr, Mn, Fe, Co or Ni) for a part of tungsten (W) at the W site of tungsten disulfide ($WS_2$). The use of such tungsten complex sulfide for active material thus leads to successful improvement of charge-discharge cycle life characteristics of rechargeable lithium batteries.

Its crystal structure can be confirmed by X-ray diffractometry (XRD) as being substantially identical to that of $WS_2$.

In the present invention, specified as the metallic element M are Cu, V, Cr, Mn, Fe, Co and Ni which have been found to effectively improve charge-discharge cycle life characteristics of rechargeable lithium batteries. These metallic elements are known as each forming a stable compound, when combined with sulfur (S), which can be decomposed at a temperature over 1,000° C. (See, for example, binary phase diagrams for M-S in "Binary Alloy Phase Diagrams", American Society for Metals, Vol.2, (1986)). That is, any of these metallic elements tends to form a relative strong chemical bond with sulfur (S) so that it occupies a part of a crystal lattice of $WS_2$ to stabilize the crystal structure. Therefore, other elements, such as Cd, In, Mo, La, Ce, Sm and Pt, which form compounds with S, are also expected to serve to improve cycle lives as analogously to the present invention.

In the above-defined formula, x (stoichiometry of the metallic element M) is specified as being below 0.48. This is because, for $x \geq 0.48$, a single phase or sulfide phase of M may be caused to separate from the crystal structure to result in reducing the effect of active material to improve the cycle life performance capability.

An electrolyte solvent for use in rechargeable lithium batteries according to the present invention may be a mixed solvent of cyclic carbonate and chain carbonate, for example. Examples of cyclic carbonates include ethylene carbonate, propylene carbonate and butylene carbonate, and examples of chain carbonates include dimethyl carbonate, methyl ethyl carbonate and diethyl carbonate. The electrolyte solvent may alternatively be a combination of the aforementioned cyclic carbonate and an ether solvent.

Examples of ether solvents include 1,2-dimethoxyethane and 1,2-diethoxyethane.

A useful electrolyte solute may be $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$ $LiC(CF_3SO_2)_3$, $LiC(C_2F_5SO_2)_3$ and any combination thereof, for example.

Other applicable electrolytes include gelled polymer electrolytes wherein a liquid electrolyte is impregnated in polymers such as polyethylene oxide and polyacrylonitrile, and inorganic solid electrolytes such as LiI and $Li_3N$.

Any electrolyte can be used for rechargeable lithium batteries in accordance with the present invention, so long as a lithium compound, as its solute used to realize an ionic conductivity, as well as its solvent used to solubilize and hold the Li compound, are hardly decomposed at voltages applied during charge, discharge and storage.

In the case where the active material of the present invention is used for a positive electrode, a suitable active material for a negative electrode may be selected from carbon materials which are capable of electrochemical storage and release of Li, such as graphite (either natural or synthetic), coke, and calcined organics; Li alloys such as Li—Al, Li—Mg, Li—In, Li—Al—Mn alloys; and metallic Li.

In such instances, an end-of-charge voltage of about 3.4 V and discharge voltage of about 2.9 V will be given. The contemplated effect of improving cycle life performances becomes more significant when the carbon materials, among those active materials, are used for a negative electrode. This is because the carbon materials are contrary in property to the Li alloys and metallic Li which, during charge and discharge, are likely to be accompanied by the growth of treelike dendrites that could cause internal short circuits, and which have a tendency to react with sulfur (S) slightly dissolved in a liquid electrolyte to form, on a negative electrode surface, a compound that could cause deactivation, such as $Li_2S$ (See, for example, a binary alloy phase diagram for Li—S in "Binary Alloy Phase Diagrams", American Society for Metals, Vol.2, p.1500 (1986)).

On the other hand, in the case where the active material of the present invention is used for a negative electrode, and lithium-containing transition metal oxide, such as $LiCoO_2$, $LiNiO_2$, $LiMn_2O_4$, $LiMnO_2$, lithium-containing $MnO_2$, $LiCo_{0.5}Ni_{0.5}O_2$, or $LiNi_{0.7}Co_{0.2}Mn_{0.1}O_2$, is used for a positive electrode, a battery can be constructed which exhibits an end-of-charge voltage of about 1.2 V and a discharge voltage of about 0.7 V. The same level of cycle life improving effect as contemplated in the present invention is obtained for this case.

The tungsten complex sulfide in accordance with the present invention can be synthesized by calcining a mixture of simple substances of respective constituent elements, a mixture of compounds of respective constituent elements, or a mixture of simple substance of one or more constituent elements and compounds of remaining constituent elements, for example. Preferably, a calcining temperature used in the calcining process is controlled between 400° C. and 1,800° C. As reported in Journal of Material Sci., Vol.20, pp.3801–3815, $WS_2$ is synthesized at the temperature of not below 400° C. At the temperature of above 1,800° C., the calcined active material may be caused to melt if it follows a binary phase diagram for W-S (See, for example, Binary Alloy Phase Diagrams, American Society for Metals, Vol.2, p.2013 (1986)). The calcined active material, if elevated to above 1,800° C. and then cooled to room temperature, may undergo irregular arrangement of constituent elements, resulting in the failure to provide the sufficient cycle life improving effect.

The electrode material of the present invention relates to tungsten complex sulfide for use as the active material of a positive or negative electrode of the rechargeable lithium battery of the present invention. The use of the electrode material of the present invention results in a marked improvement of charge-discharge cycle life characteristics, because of its stable crystal structure maintained even during insertion and release of lithium ions.

The electrode material of the present invention may be incorporated in rechargeable lithium batteries in the form of lithium-containing or lithium-free composition. The electrode material of the present invention can be used as the active material of a positive electrode or a negative electrode.

DESCRIPTION OF PREFERRED EXAMPLES

Figure 1:
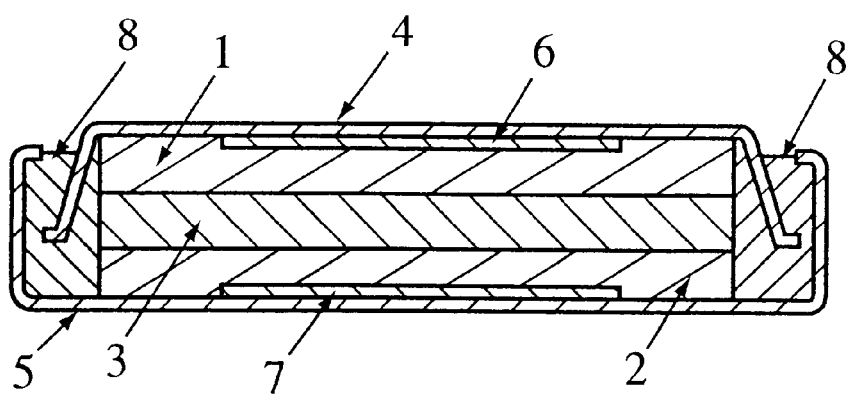
FIG. 1 is a schematic sectional view, showing one embodiment of a rechargeable lithium battery in accordance with the present invention.

The present invention is now described in more detail with reference to preferred examples. It will be recognized that the following examples merely illustrate the practice of the present invention but are not intended to be limiting thereof. Suitable changes and modifications can be effected without departing from the scope of the present invention.

EXAMPLE 1

Flat-disc type batteries were assembled utilizing natural graphite active material for a negative electrode, and the active material of the present invention represented by the formula $M_{0.2}W_{0.8}S_2$ (M is Cu, V, Cr, Mn, Fe, Co or Ni) for a positive electrode. Each battery was measured for charge-discharge cycle life. Example 1 was conducted to investigate how the substitution of each metallic element M for a part of tungsten in WS affected the charge- discharge cycle life.

(A) Positive Electrode Preparation 99.9 % pure Cu, W and S reagents, as starting materials, were respectively weighed such that a ratio of numbers of Cu, W and S atoms was brought to 0.2:0.8:2.0, and then mixed in a mortar. The mixture was pressed in a 17 mm-diameter mold at a pressure of 115 kg/cm² into a shape, calcined under argon atmosphere at 900° C. for 10 hours, and then crushed in a mortar to obtain a powder of calcined $Cu_{0.2}W_{0.8}S_2$ which had an average particle size of 10 μm.

85 parts by weight of the $Cu_{0.2}W_{0.8}S_2$ powder, 10 parts by weight of carbon powder as an electrical conductor, and 5 parts by weight of poly(vinylidene fluoride) powder as a binder were mixed. By adding this mixture to a N-methyl-pyrrolidone (NMP) solution, a slurry was formed. The slurry was applied by a doctor blade technique onto one surface of a 20 μm thick aluminum current collector to form an active material layer thereon. The current collector carrying the active material layer thereon was dried at 150° C. and then punched to remove therefrom a disc-form positive electrode having a diameter of 10 mm and a thickness of about 80 μm.

(B) Li Insersion Into Positive Electrode $LiPF_6$ was dissolved in a mixed solvent consisting of equivolume of ethylene carbonate and diethyl carbonate to a concentration of 1 mole/l to obtain an electrolyte solution. The above-prepared positive electrode, metallic Li and a microporous polypropylene membrane placed therebetween were located in the electrolyte solution, and then subjected to electrolysis at a constant current of 100 μA to 2.4 V versus Li/Li⁺, so that Li was inserted into the positive electrode. The positive electrode thus obtained was used in the following battery assembly (E).

(C) Negative Electrode Preparation 95 parts by weight of natural graphite powder and 5 parts by weight of poly(vinylidene fluoride) powder were mixed. A slurry was formed by adding this mixture to an NMP solution. This slurry was coated by a doctor blade technique onto one surface of a 20 μm thick copper current collector to form a active material layer thereon. The current collector carrying the active material layer thereon was dried at 150° C. and then punched to remove therefrom a disc-form negative electrode having a diameter of 10 mm and a thickness of about 60 μm. The negative electrode thus prepared was used in the following battery assembly (E)

(D) Electrolyte Preparation $LiPF_6$ was dissolved in a mixed solvent consisting of equivolume of ethylene carbonate and diethyl carbonate to a concentration of 1 mole/l to obtain an electrolyte solution. This electrolyte solution was used in the subsequent battery assembly (E).

(E) Battery Assembly

By utilizing the positive electrode, negative electrode and electrolyte solution respectively prepared in (B), (C) and (D), a flat-disc type rechargeable lithium battery A-1 of Example 1 was assembled. A microporous polypropylene membrane was used for a separator.

FIG. 1 is a schematic sectional view, illustrating a rechargeable lithium battery as assembled. The battery includes the positive electrode 1, the negative electrode 2, the separator 3, a positive can 4, a negative can 5, a positive current collector 6, a negative current collector 7 and an insulating polypropylene gasket 8.

The positive electrode 1 and the negative electrode 2 are disposed on opposite sides of the separator 3 in a battery case defined by the positive and negative cans 4 and 5. The positive electrode 1 is electrically coupled to the positive can 4 by the positive current collector 6. The negative electrode 2 is electrically coupled to the negative can 5 by the negative current collector 7. Such arrangements allow the construction of a rechargeable lithium battery.

In order to investigate how the type of metallic element M substituted for a part of W in $WS_2$ affects the charge-discharge cycle life of a resulting battery, other rechargeable lithium batteries A-2 through A-7 of Example 1 were assembled by following the above procedures with the exception that the Cu reagent, as the starting material used in the procedure (A), was changed to a V, Cr, Mn, Fe, Co or Ni reagent.

(F) Charge-Discharge Cycle Life Characteristics

Each battery was charged at a current of 100 µA at 25° C. to 3.4 V and then discharged at a current of 100 µA to 2.4 V. This unit cycle was repeated and a capacity retention (%) was determined by a ratio of a 50th-cycle discharge capacity to a 1st-cycle discharge capacity. The results are given in Table 1.

An average discharge voltage was about 2.9 V and an initial capacity was 113–118 mAh.

TABLE 1

| BATTERY DESIGNATION | POSITIVE ELECTRODE MATERIAL | NEGATIVE ELECTRODE MATERIAL | CAPACITY RETENTION (%) |
|---|---|---|---|
| A-1 | $Cu_{0.2}W_{0.8}S_2$ | Graphite | 88 |
| A-2 | $V_{0.2}W_{0.8}S_2$ | Graphite | 90 |
| A-3 | $Cr_{0.2}W_{0.8}S_2$ | Graphite | 89 |
| A-4 | $Mn_{0.2}W_{0.8}S_2$ | Graphite | 91 |
| A-5 | $Fe_{0.2}W_{0.8}S_2$ | Graphite | 87 |
| A-6 | $Co_{0.2}W_{0.8}S_2$ | Graphite | 88 |
| A-7 | $Ni_{0.2}W_{0.8}S_2$ | Graphite | 90 |

EXAMPLE 2

Flat-disc type batteries A-8 and A-9 of Example 2 were assembled utilizing the active material of the present invention, $Cu_{0.2}W_{0.8}S_2$, for a positive electrode, and metallic lithium and Li—Al alloy (Li content by weight of 20.6 parts) for a netative electrode. Each battery was measured for charge-discharge cycle life.

The procedures (A), (D) and (E) as employed in Example 1 were followed to prepare the positive electrode and electrolyte solution and assemble batteries. The procedure (B) used in Example 1 for insersion of lithium into the positive electrode was not carried out in Example 2. A negative electrode was prepared according to the following procedure.

(C') Negative Electrode Preparation

A sheet composed of metallic Li and Li—Al alloy (Li content by weight of 20.6 parts) was punched under argon atmosphere to remove therefrom a disc-form negative electrode having a diameter of 10 mm and a thickness of 1.0 mm. This negative electrode was used in the subsequent battery assembly.

(F') Charge-Discharge Cycle Life Characteristics

Each battery was discharged at a current of 100 µA at 25° C. to 2.4 V. Subsequently, the battery was charged at a current of 100 µA to 3.4 V and then discharged at a current of 100 µA to 2.4 V, which was recorded as a 1st cycle.

Thereafter, a unit cycle consisted of the charging at a current of 100 µA to 3.4 V and the subsequent discharging at a current of 100 µA to 2.4 V. This unit cycle was repeated and a capacity retention (%) was determined by a ratio of a 50th-cycle discharge capacity to a 1st-cycle discharge capacity. The results are given in Table 2.

An average discharge voltage was 2.9 V for A-8 and 2.5 V for A-9. An initial capacity was 116 mAh.

TABLE 2

| BATTERY DESIGNATION | POSITIVE ELECTRODE MATERIAL | NEGATIVE ELECTRODE MATERIAL | CAPACITY RETENTION (%) |
|---|---|---|---|
| A-8 | $Cu_{0.2}W_{0.8}S_2$ | Li | 67 |
| A-9 | $Cu_{0.2}W_{0.8}S_2$ | Li—Al (Li content by weight of 20.6 parts) | 71 |

EXAMPLE 3

Flat-disc type batteries A-10 through A-12 of Example 3 were assembled utilizing the active material of the present invention, $Cu_{0.2}W_{0.8}S_2$, for a negative electrode, and a well-known lithium-containing transition metal compound, i.e., $LiCoO_2$, $LiNiO_2$ or $LiMn_2O_4$ (See, for example, T.Ohzuku et al., Solid State Ionics 69 (1994), p.201), for a positive electrode. Each battery was measured for charge-discharge cycle life.

The procedure (A) used in Example 1 for preparation of positive electrode was followed, except that the current collector material was changed from Al to Cu, to obtain $CU_{0.2}W_{0.8}S_2$ for use in the active material of the negative electrode. The procedures (D) and (E) used in Example 1 were followed to prepare the electrolyte solution and assemble batteries. The procedure (B) used in Example 1 for insersion of lithium into the positive electrode (negative electrode in the present case) was not carried out in Example 2. A positive electrode was prepared according to the following procedure.

(A') Positive Electrode Preparation $Li_2CO_3$ and $CoCO_3$, as starting materials, were weighed such that a ratio of numbers of Li and Co atoms was brought to 1:1, and then mixed in a mortar. The mixture was pressed in a 17 mm-diameter mold at a pressure of 115 kg/cm² into a shape, calcined in the air at 800° C. for 24 hours, and then crushed in a mortar to obtain a $LiCoO_2$ powder having an average particle size of 10 µm.

85 parts by weight of the $LiCoO_2$ powder, 10 parts by weight of carbon powder as an electrical conductor, and 5 parts by weight of poly(vinylidene fluoride) powder as a binder were mixed. A slurry was formed by adding this mixture to a N-methyl-pyrrolidone (NMP) solution. The slurry was coated by a doctor blade technique onto one surface of a 20 µm thick aluminum current collector to form an active material layer thereon. The current collector carrying the active material layer thereon was dried at 150° C. and then punched to remove therefrom a disc-form positive electrode having a diameter of 10 mm and a thickness of about 80 µm.

(F") Charge-Discharge Cycle Life Characteristics

Each battery was charged at a current of 100 μA at 25° C. to 1.2 V and then discharged at a current of 100 μA to 0.2 V. This was recorded as a 1st-cycle. Thereafter, a unit cycle consisted of the charging at a current of 100 μA to 1.2 V and the subsequent discharging at a current of 100 μA to 0.2 V. This unit cycle was repeated and a capacity retention (%) was determined by a ratio of 50th-cycle discharge capacity to a 1st-cycle discharge capacity. The results are given in Table 3.

An average discharge voltage was 0.7 V and an initial capacity was 116 mAh.

TABLE 3

| BATTERY DESIGNATION | POSITIVE ELECTRODE MATERIAL | NEGATIVE ELECTRODE MATERIAL | CAPACITY RETENTION (%) |
|---|---|---|---|
| A-10 | $LiCoO_2$ | $Cu_{0.2}W_{0.8}S_2$ | 93 |
| A-11 | $LiNiO_2$ | $Cu_{0.2}W_{0.8}S_2$ | 97 |
| A-12 | $LiMnO_2$ | $Cu_{0.2}W_{0.8}S_2$ | 91 |

EXAMPLE 4 AND COMPARATIVE EXAMPLE 1

In Example 4 and Comparative Example 1, flat-disc type batteries were assembled utilizing the active material of the present invention, $Cu_xW_{1-x}S_2$, for a positive electrode, and natural graphite active material for a negative electrode. In the active material preparation, the M (Cu) stoichiometry was varied to investigate the effect of the stoichiometry x of the metallic element M (Cu in the present case) in the formula $M_xW_{1-x}S_2$ on the charge-discharge cycle life. Specifically, flat-disc type batteries A-13 through A-18 of Example 4 were assembled in the same manner as in Example 1, which incorporated, as their respective positive electrode materials, $Cu_{0.02}W_{0.98}S_2$, $Cu_{0.05}W_{0.95}S_2$, $Cu_{0.1}W_{0.9}S_2$, $Cu_{0.3}W_{0.7}S_2$, $Cu_{0.4}W_{0.6}S_2$, and $Cu_{0.45}W_{0.55}S_2$. For comparative purposes, flat-disc type batteries B-1 through B-3 of Comparative Example 1 were also assembled in the same manner as in Example 1, which incorporated, as their respective positive electrode materials, $WS_2$, $Cu_{0.48}W_{0.52}S_2$, and $Cu_{0.5}W_{0.5}S_2$. Each battery was measured for charge-discharge cycle life.

Figure 2:
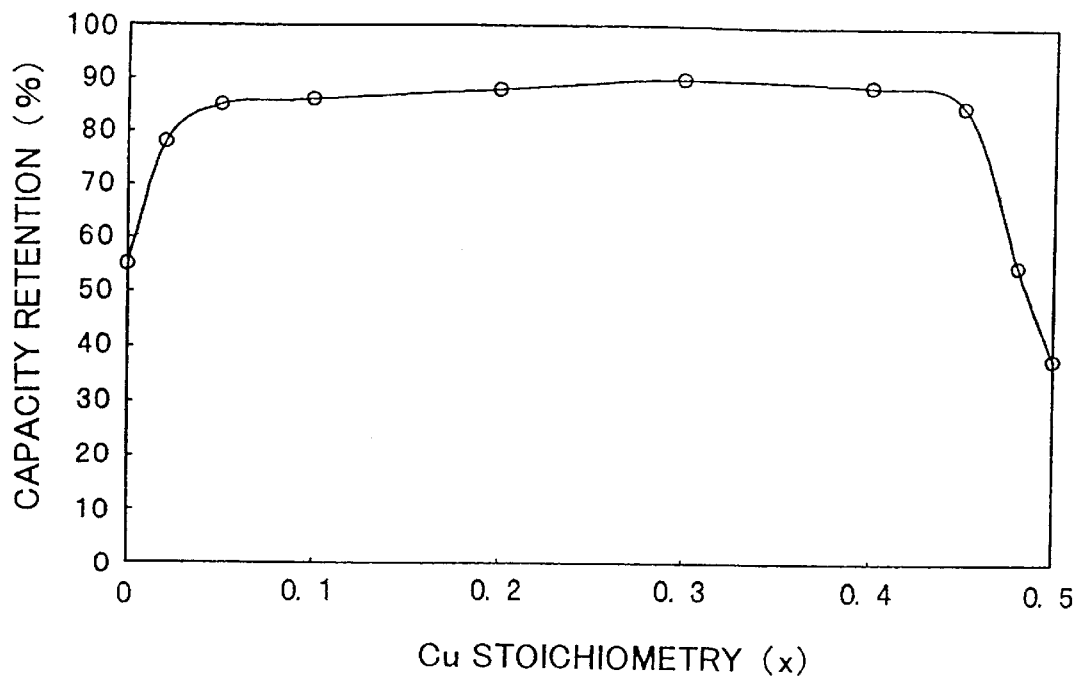
FIG. 2 is a graph illustrating the relationship between the Cu stoichiometry in tungsten copper sulfide active material and capacity retention of a rechargeable lithium battery utilizing the active material.

The results are given in FIG. 2. In FIG. 2, the result for the flat-disc type battery A-1 according to the present invention is also shown. An average discharge voltage was 2.9 V and an initial capacity was 80–120 mAh.

As can be seen from the results shown in FIG. 2, the capacity retention ranged from 38 to 55%, for x=0 or x≧0.48. For 0<x<0.48, the batteries incorporating the positive electrode material, $Cu_xW_{1-x}S_2$, exhibited improved cycle life performances. Particularly for 0.05<x<0.45, the batteries incorporating the positive electrode material, $Cu_xW_{1-x}S_2$, exhibited excellent cycle life performances, i.e., the capacity retentions between 78% and 90%.

As can be appreciated from FIG. 2, the capacity retention started to decline as the Cu stoichiometry x in the formula $Cu_xW_{1-1}S_2$ exceeds 0.45. This is considered to have resulted because two phases of copper sulfide and tungsten copper sulfide started to coexist as x exceeded 0.45. The declination of capacity retention was accelerated for x≧0.48. This is considered to demonstrate that, for x<0.48, separation of the simple substance or sulfide phase of Cu from the crystal lattice was not significant, and the Cu inclusion was within the permissible range to stabilize the crystal structure of the tungsten copper sulfide active material.

EXAMPLE 5

In Example 5, flat-disc type batteries were assembled utilizing the active material of the present invention, $Cu_{0.2}W_{0.8}S_2$, for a positive electrode. In the preparation of the positive active material, a calcining temperature was varied to investigate its effect on the charge-discharge cycle life of a resulting battery. Specifically, the procedures used in Example 1 were followed, except that the calcining temperature used in the procedure (A) was changed from 900° C. to 200° C., 400° C., 600° C., 800° C., 1,000° C., 1,200° C., 1,400° C., 1,600° C., 1,800° C., or 1,900° C., to assemble flat-disc type batteries A-19 through A-28 of Example 5, which each incorporated, as its respective positive electrode material, the active material of the present invention, $Cu_{0.2}W_{0.8}S_2$. Each battery was measured for charge-discharge cycle life.

Figure 3:
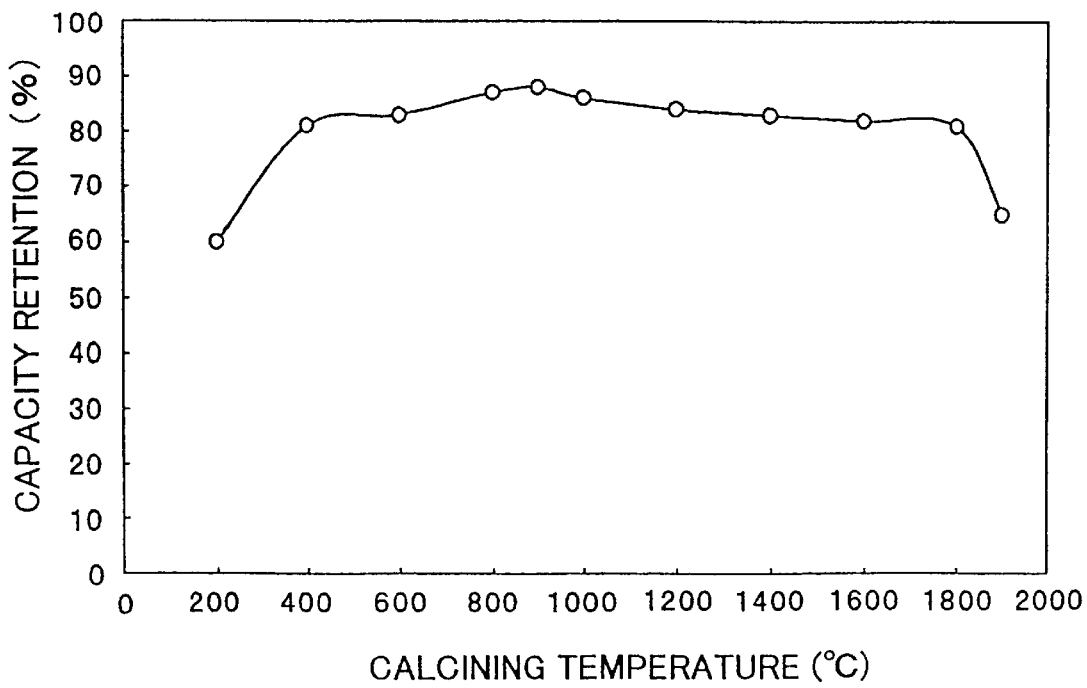
FIG. 3 is a graph illustrating the relationship between calcining temperature used in obtaining active material and capacity retention of a rechargeable lithium battery utilizing the active material.

The results are shown in FIG. 3. In FIG. 3, the result for the flat-disc type battery A-1 according to the present invention is also shown. An average discharge voltage was 2.9 V and an initial capacity was 55–120 mAh.

As can be seen from FIG. 3, the flat-disc type batteries as assembled in Examples 1 and 5 using the active material of the present invention for their respective positive electrodes all exhibited high levels of capacity retention, ranging from 60 to 88%, regardless of the calcining temperature used to prepare the active material. Particularly, the capacity retention ranged from 81 to 88% for the calcining temperature within the range of 400–1,800° C., and from 87 to 88 % for the calcining temperature within the range of 800–900° C. This demonstrates that the preferred calcining temperature is within the range of 400–1,800° C.

The references as heretofore published disclose that a mixture of starting materials starts to form $WS_2$ active material as the calcining temperature is elevated to reach 400° C. (See, for example, J Material Sci., Vol.20, pp.3801–3815) and that the calcined $WS_2$ starts to melt as the temperature exceeds 1,800° C. (See, for example, a binary phase diagram for W-S in Binary Alloy Phase Diagrams, Vol.2, p.2013 (1986), American Society for Metals). In the light of those disclosures, the active material of the present invention, $Cu_{0.2}W_{0.8}S_2$, is believed to have undergone irregular arrangement of constituent atoms when it was once elevated above 1,800° C. and then cooled to room temperature, and thus have reduced its effect of improving battery cycle life performances.

According to the present invention, a rechargeable lithium battery incorporating the electrode active material having a stable crystal structure is provided which exhibits improved cycle life performance. Thus, the reliability of equipment, if powered by the rechargeable lithium battery of the present invention, can be increased.

The use of the active material of the present invention for a positive or negative electrode of rechargeable lithium batteries leads to the improved cycle life performance characteristics thereof.

What is claimed is:

1. A rechargeable lithium battery comprising a positive electrode, a negative electrode and a non-aqueous electrolyte,
   wherein at least one of said electrodes comprises a first active material comprising a tungsten complex sulfide, wherein said tungsten complex sulfide is represented by the formula $M_xW_{1-x}S_2$ where M is at least one element selected from Cu, V, Cr, Mn, Fe, Co and Ni, and x satisfies the relationship 0<x<0.48, and wherein said tungsten complex sulfide has substantially the same crystal structure as $WS_2$ in X-ray diffractometry.

2. The rechargeable lithium battery according to claim 1, wherein said first active material further comprises lithium added to said tungsten complex sulfide.

3. The rechargeable lithium battery according to claim 1, wherein said first active material does not comprise lithium added to said tungsten complex sulfide.

4. The rechargeable lithium battery according to claim 1, wherein said positive electrode comprises said first active material, and wherein said negative electrode comprises a second active material comprising a carbon material.

5. The rechargeable lithium battery according to claim 4, wherein said second active material further comprises lithium added to said carbon material.

6. The rechargeable lithium battery according to claim 4, wherein said second active material does not comprise lithium added to said carbon material.

7. The rechargeable lithium battery according to claim 1, wherein said negative electrode comprises said first active material, and wherein said positive electrode comprises a second active material comprising a lithium-containing transition metal oxide.

8. The rechargeable lithium battery according to claim 1, wherein said tungsten complex sulfide has been synthesized by calcining a material mixture containing constituent elements of said tungsten complex sulfide at a temperature in a range from 400° C. to 1800° C.

9. The rechargeable lithium battery according to claim 1, wherein said tungsten complex sulfide has a crystal structure identical to a crystal structure of said $WS_2$ as shown by X-ray diffractometry except for the substitution of said M for a part of said W at respective sites of said W in said crystal structure of said $WS_2$.

10. An electrode material for use in rechargeable lithium batteries, comprising a tungsten complex sulfide represented by the formula $M_xW_{1-x}S_2$ where M is at least one element selected from Cu, V, Cr, Mn, Fe, Co and Ni, and x satisfies the relationship $0<x<0.48$, and wherein said tungsten complex sulfide has substantially the same crystal structure as $WS_2$ in X-ray diffractometry.

11. The electrode material according to claim 10, further comprising lithium added to said tungsten complex sulfide.

12. The electrode material according to claim 10, wherein said electrode material does not comprise lithium added to said tungsten complex sulfide.

13. The electrode material according to claim 10, wherein said tungsten complex sulfide has a crystal structure identical to a crystal structure of said $WS_2$ as shown by X-ray diffractometry except for the substitution of said M for a part of said W at respective sites of said W in said crystal structure of said $WS_2$.

* * * * *

UNITED STATES PATENT AND TRADEMARK OFFICE
CERTIFICATE OF CORRECTION

PATENT NO.    : 6,319,633 B1
DATED         : November 20, 2001
INVENTOR(S)   : Ikeda et al.

It is certified that error appears in the above-identified patent and that said Letters Patent is hereby corrected as shown below:

Column 2,
Line 35, after "$C_4F_9SO_2$)" insert -- , --.

Column 6,
Table 2, column 2, under the heading "NEGATIVE ELECTRODE MATERIAL", replace "(Li content by weight of 20.6 parts) by -- (Li content of 20.6 parts by weight) --.

Column 7,
Line 34, replace "$Cu_{0.3}w_{0.7}S_2$," by -- $Cu_{0.3}W_{0.7}S_2$, --.
Line 55, before exceeds", replace "$Cu_xW_{1-1}S_2$" by -- $Cu_xW_{1-x}S_2$ --.

Signed and Sealed this

Twenty-first Day of May, 2002

Attest:

Attesting Officer

JAMES E. ROGAN
Director of the United States Patent and Trademark Office